United States Patent [19]

Daviaud et al.

[11] Patent Number: 4,763,518
[45] Date of Patent: Aug. 16, 1988

[54] METHOD FOR MEASURING NET INTERNAL VOLUME OF A RECEPTACLE CONTAINING AN UNKNOWN VOLUME OF RESIDUAL LIQUID

[75] Inventors: Jean-Michel Daviaud; Pascal Herbert, both of Nantes; Patrick Loison, Bouaye, all of France

[73] Assignee: Frigo France, France

[21] Appl. No.: 28,796

[22] Filed: Mar. 23, 1987

[51] Int. Cl.⁴ ............................................. G01F 17/00
[52] U.S. Cl. .................... 73/149; 73/290 B; 73/1 H; 141/5; 222/1
[58] Field of Search .............. 73/149, 290 B, 40, 49.2, 73/1 H; 222/1, 71; 141/5

[56] References Cited

U.S. PATENT DOCUMENTS

| | | | |
|---|---|---|---|
| 1,885,926 | 11/1932 | Lewis | 73/290 B |
| 3,113,448 | 12/1963 | Hardway, Jr. et al. | 73/149 X |
| 3,744,306 | 7/1973 | Krueger | 73/149 |

FOREIGN PATENT DOCUMENTS

| | | | |
|---|---|---|---|
| 2225359 | 12/1973 | Fed. Rep. of Germany | 73/149 |
| 2524140 | 9/1983 | France | 73/149 |
| 398829 | 12/1973 | U.S.S.R. | 73/149 |
| 530185 | 3/1977 | U.S.S.R. | 73/149 |
| 1137315 | 1/1985 | U.S.S.R. | 73/149 |
| 1154536 | 5/1985 | U.S.S.R. | 73/149 |

Primary Examiner—Tom Noland
Attorney, Agent, or Firm—John R. Benefiel

[57] ABSTRACT

A method for measuring the net internal volume of test receptacles each containing an unknown but variable volume of a liquid, such as in testing automatic transmissions containing residual amounts of transmission fluid, to determine the exact volume of fluid needed to be added to fill the transmission to the correct level. The method places a pressurized reference vessel in communication with the internal spaces of a sealed transmission upon opening of a valve allowing the pressure to fall by expansion from the reference vessel into the transmission. The resulting reduce pressure is initially sensed shortly after the valve is opened, and subsequently after a more prolonged interval, allowing the pressure to be substantially stabilized. The receptacle net internal volume is then determined from the relationship between the preliminary pressure in the reference vessel and the stabilized final pressure by application of Boyle's law, and the volume of liquid to be added calculated therefrom. The difference between the initial and subsequent pressure readings sensed after the valve is opened is used to generate a correction applied to the calculated volume to offset the error created by an outflow through any small leaks which might exist.

7 Claims, 2 Drawing Sheets

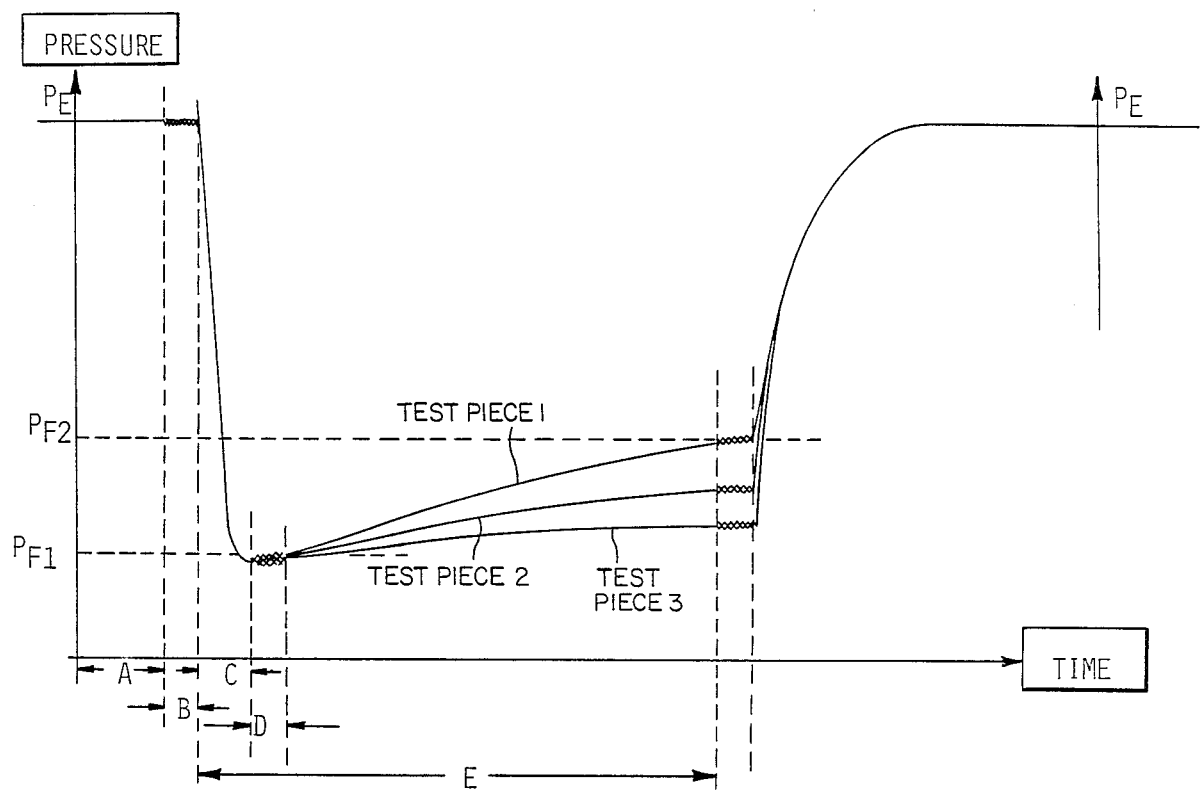
Fig-3
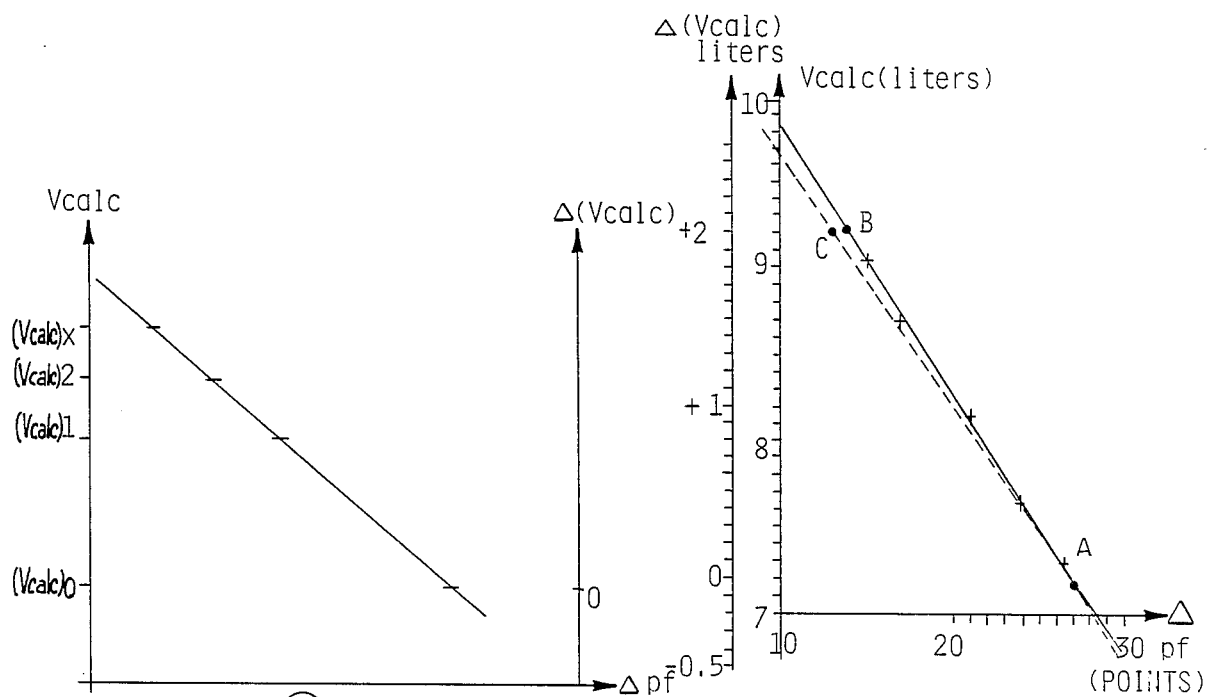
Fig-4
Fig-5

METHOD FOR MEASURING NET INTERNAL VOLUME OF A RECEPTACLE CONTAINING AN UNKNOWN VOLUME OF RESIDUAL LIQUID

BACKGROUND OF THE INVENTION

1. Field of the Invention

This invention concerns measurement of internal volumes, and more particularly measurement of the net internal volume of successive test pieces containing unknown amounts of a liquid. Such measurements are useful in the determination of the amount of liquid to be added to bring the liquid to a prescribed level, as in filling transmissioons during automobile assembly operations which transmissions contain an unknown residual volume of transmission fluid from previous testing operations.

2. Description of the Prior Art

It has heretofore been known to measure the internal volume of a receptacle by connecting a reference vessel pressurized with compressed air to the unpressurized interior of the receptacle, and allowing the compressed air to expand into this interior space of the receptacle. The final pressure level thereafter subsisting in the space comprised of the interior of both the receptacle and the reference vessel is related to the beginning pressure in the same proportion that the volume of the reference vessel bears to the total volume of the connected reference volume and receptacle, as stated by Boyle's Law. Since the volume of the reference vessel is known as well as the "dry" volume of the receptacle, the precise net volume of the receptacle with an unknown volume of liquid may be computed.

Such a method assumes that no leaks exist, since the presence of such leaks would invalidate the calculations due to the loss of pressurized fluid during the test, causing the final pressure to be lower than if no leaks existed.

As noted, the above basic method has been applied to measure the volume of residual transmission fluid in transmissions during automotive assembly operations. In applying the method, the various outlets are sealed, i.e., tachometer, vent, cooler lines, etc., and a connection made to the reference tank, typically to the filler tube.

Imperfect sealing of the openings sometimes occurs during this procedure, and slight leakage may also occur through the transmission housing joints or at various other points such as past the transmission shaft seals.

The present invention enables the effects of such leaks on the volume measurement to be corrected to produce accurate measurement despite the presence of small leaks.

SUMMARY OF THE INVENTION

According to the present invention, the presence of a small leak is detected by initially reading the pressure level shortly after the reference vessel and the receptacle are placed in communication with each other, as well as subsequently after the pressure level existing in the system has stabilized.

The difference between the initial and subsequent pressure value readings has been determined by the present inventors to be the same for each type of test piece, if no leak or a leak of constant flow rate is present. That is, variations in the stabilized final pressure occur because of the presence of different levels of residual liquid in successive test pieces, but the final pressure is always related by a fixed pressure difference between the initial and subsequent pressure readings if the leakage rate is zero or constant. This relationship may be experimentally verified by tests on a receptacle containing no leaks, but variable levels of residual liquid.

Beginning with no leak at a given pressure difference between the initial and subsequent pressure readings, increasing leak rates cause a proportionally decreasing difference between the initial and subsequently sensed pressure values.

Variations in the differential pressure readings correspond to the rate of any small leaks, and this fact allows a correction function to be established to correct for the leak. That is, as the leak rate increases, there is a relative reduction in the substantially stabilized fluid pressure relative to the initial sensed pressure, and this effect allows the error in the calculated volume to be computed and applied to offset that error.

It has been discovered that the correction function to be applied to the calculated volume comprises a linear function of the sensed pressure difference of the form:

$$k_2 (\Delta Pf) - C_{st}$$

The factor $k_2$ and the constant $C_{st}$ are determined by experiment with a "dry" receptacle to establish the correcting function.

Detection of a gross leak triggers an alarm, rather than calculation of a corrected volume.

DESCRIPTION OF THE DRAWINGS

FIG. 3 is an x-y plot of pressures for a constant residual volume with different rates of leakage representing three representative test places.

FIG. 4 is a plot of the relationship between the difference between the initial and stabilized sensed pressures and the calculated fill volume.

FIG. 5 is a plot of experimental data on the calculated fill volume and the sensed pressure difference made in order to calculate the correction constant $C_{st}$ and factor $k_2$.

DETAILED DESCRIPTION

In the following detailed description, certain specific terminology will be employed for the sake of clarity and a specific embodiment described in accordance with the requirements of 35 USC 112, but it is to be understood that the same is not intended to be limiting and indeed the invention is capable of taking many forms within the scope of the appended claims.

Figure 1:
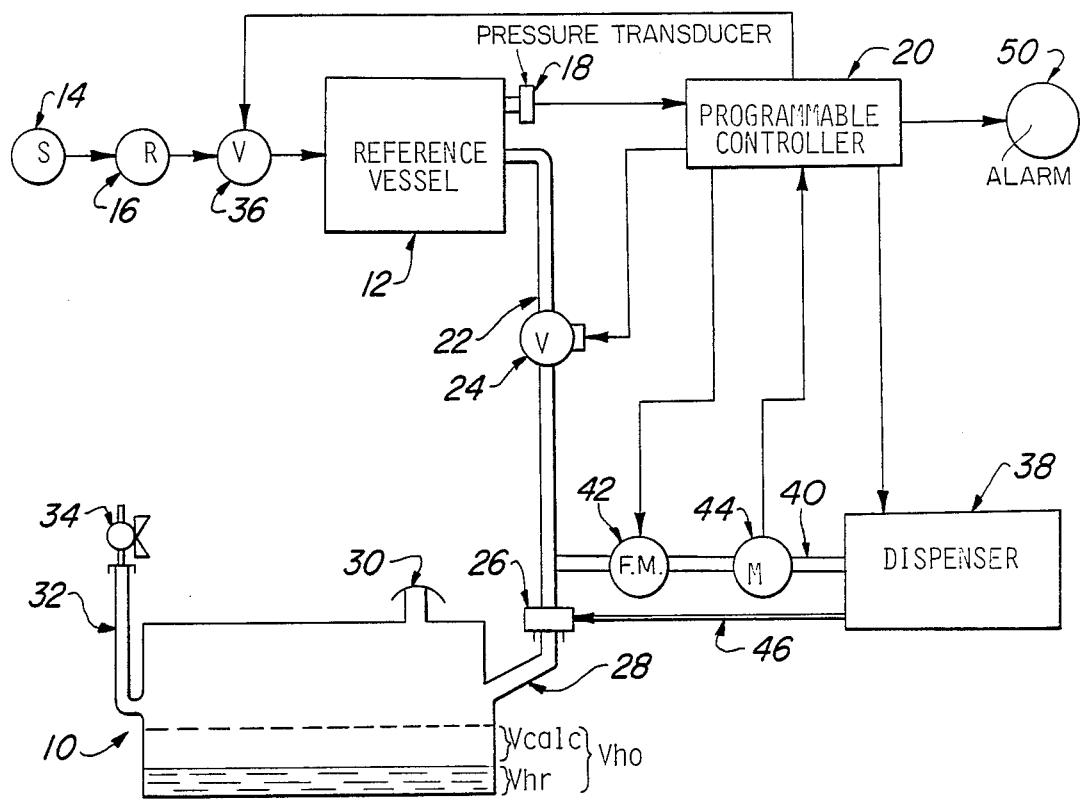
FIG. 1 is a diagrammatic representation of net volume measuring apparatus which may be used to practice the method according to the present invention, connected to a sealed automatic transmission containing a small amount of residual transmission fluid.

Referring to FIG. 1, the present invention concerns successively measuring the net internal volume of each of a series of test piece receptacles 10, here schematically shown as an automatic transmission, containing an unknown volume of residual liquid $V_{hr}$. This is done in this particular application in order to accurately calculate the volume of liquid needed to be added, $V_{calc}$ to bring the total volume of liquid to a predetermined volume $V_{ho}$.

According to the present method, a reference vessel, shown as a tank 12, is first pressurized with a gas, such as a source 14 of pressurized air, to an accurately controlled moderate pressure level, on the order of 4 psig, using a precision regulator 16.

The tank pressure level is monitord by a high accuracy (0.1%) pressure transducer 18, which operates a corresponding electrical signal transmitted to a programmable controller 20, incorporating a microprocessor to receive and record data, perform calculations, and generate control signals, in the manner well known to those skilled in the art.

The reference vessel 12 is able to be controllably placed in communication with transmission 10 by line 22, having a solenoid valve 24 mounted therein, line 22 connected via an adapter 26 to the fill tube 28 of the transmission 10.

The transmission 10 has all its outlet orifices temporarily sealed during the measurement process, such as the vent 30 and the coolant line 32.

During calibration tests to determine certain constants as will be described, one of the orifices, such as the coolant line 32 is controllably sealed with a needle valve 34 to allow establishing a small degree of leakage of progressively increasing flow rates.

The programmable controller 20 generates a control signal at the start of each test to close a solenoid valve 36 to isolate the reference vessel 12, solenoid valve 24 also being previously closed to isolate the vessel 12.

Figure 2:
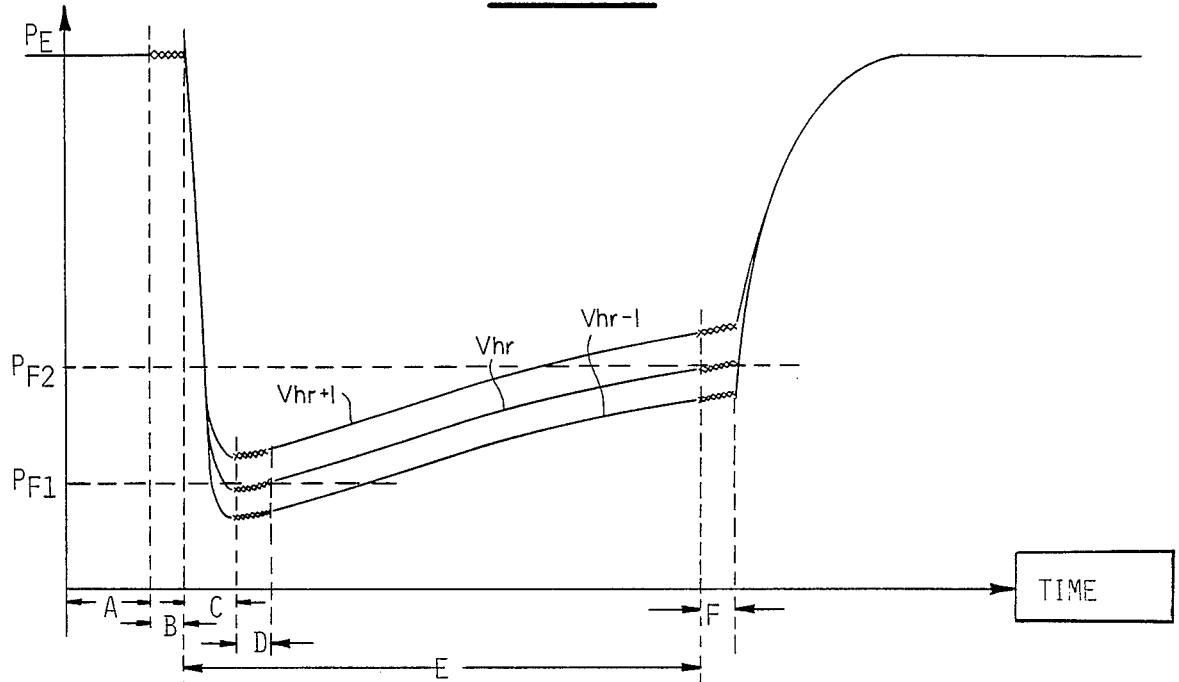
FIG. 2 is an x-y plot of sensed pressures for three different levels of residual liquid and a constant leakage rate.

FIG. 2 illustrates a typical cycle for a series of test pieces having varying volumes of residual liquid $V_{hr}+1$, $V_{hr}$, $V_{hr}-1$.

After a short period A, i.e., 5 seconds, to allow stabilization, a series of pressure measurements from the transducer 18 are recorded over a brief period B, i.e., 2 seconds, by the programmable controller 20 to obtain an average preliminary pressure in the reference vessel 12.

The solenoid valve 24 is then opened by a control signal from the programmable controller 20 to place the pressurized reference vessel 12 in communication with the interior space.

The pressurized gas expands immediately into the unpressurized interior spaces of the transmission 10. After a short interval, C, i.e., 3 seconds, a series of pressure readings are recorded over a next brief interval, D, i.e., 2 seconds, to obtain an initial average pressure reading in the system comprised of the interior space of the reference vesssel 12, connecting piping and valves and the transmission 10.

After a much longer interval, E, i.e., 30 seconds, a subsequent series of pressure readings are recorded over period F, to obtain an average pressure value closely approximating the final, stabilized pressure in the system.

According to Boyle's law, the relationship between the preliminary pressure in the reference vessel and connecting piping upstream of the valve 24 and the final stabilized pressure in the entire system, is proportional to the relative volumes, i.e., $$P_1 V_1 = P_2 V_2$$

If the various constants are known, i.e., the volumes of the reference vessel 12, the piping, etc. the net internal volume of the receptacle 10 can be calculated and thus also the volume $V_{calc}$ needed to be added to bring the volume of liquid to the desired level $V_{ho}$.

The final pressure $Pf_2$ increases with increasing volumes of residual liquid $V_r$ as shown in FIG. 2.

The reference vessel 12 is thereafter disconnected and repressurized for the next cycle.

Preferably, two reference vessels 12 are alternately used to eliminate the need for a waiting period before initiating the next test.

The programmable controller 20 can then generate suitable control signals to a dispenser unit 38 to dispense the appropriate volume $V_{calc}$ into the transmission 10 via piping 40, flow meter 42 and solenoid valve 44 and adapter 26. The flow meter 42 generates a digital count which is sent to the programmable controller 20 which shuts off the solenoid valve 44. An air injection separation via line 46 could be employed to break the oil column at the adaptor 26, and the dispenser 38 may suction back the excess oil for reprocessing in order to provide a dripless disconnect.

The above Boyle's law calculation assumes leak free seals and connections. If leaks are present, the final pressure is reduced, as shown in FIG. 3, which depicts pressures for three test pieces 1, 2 and 3, having successively increasing leak rates causing lowered final pressures $Pf_2$, measured in the interval F.

Thus, if a leak is present of unknown magnitude, the calculation will be erroneous, in that the sensed pressure $Pf_2$ is falsely lowered correspondingly increasing the magnitude of $V_{calc}$.

Thus, an overall formula may be used as follows:

$$V_{calc} = k_1[(P_e/Pf_2 \times V_e) - V_e - V_t + V_{ho} - V_{bs}] - C_{st} + (k_2 X \Delta Pf)$$

Where:

$V_{calc}$ = volume to be added into transmission
$k_1$ = correction factor (short stabiliztion time)
$P_e$ = average preliminary pressure in reference tank
$Pf_2$ = average pressure in total system after 30 seconds
$V_e$ = reference tank volume
$V_t$ = volume of pipes of manifolds and adaptor
$V_{ho}$ = theoretical net volume of the transmission with correct level
$V_{bs}$ = dry internal volume of transmission (no oil residual)
$C_{st}$ = correction constant for small leaks
$k_2$ = correction factor for small leaks
$\Delta Pf = Pf_2 - Pf_1$
$Pf_1$ = average pressure in the system after 3 seconds
$k_1$ approaches 1.0 and is required where the period E is too short to achieve substantially stabilized pressure in the system.

According to the concept of the present invention, a correction function is developed based on the difference between the initial measured pressure $Pf_1$, and the subsequent pressure $Pf_2$ or $\Delta Pf$.

FIG. 4 illustrates a plot of empirical data on a receptacle showing that as the differential pressure $\Delta Pf$ increases, the value of $V_{calc}$ decreases until at a given pressure differential $Pf_o$ corresponding to a zero leak rate, an accurate or true $V_{calc}$ is calculated. It is noted that the straight line connecting the points in FIG. 4 comprises a correction function to find $V_{calc}$ from a given $V_{calc}$ in the presence of a leak rate and $\Delta Pf_x$.

The form of the correction function is:

$$-C_{st} + k_2 \Delta Pf$$

That is, the algebraic sum of a correction constant, $-C_{st}$ and the product of a correction factor $k_2$ and the pressure difference $\Delta Pf$ is added to a calculated $V_{calc}$ to yield the true $V_{calc}0$.

The values of $C_{st}$ and $k_2$ for a given receptacle configuration are arrived at experimentally. That is, a dry transmission is connected in FIG. 1, with a needle valve 34 connected to one of the orifices. After verifying that no leaks exist, a test is run with the needle valve 34 completely closed to determine $\Delta Pf$.

One or more additional tests are run with progressive opening of the needle valve 34 to establish controlled leaks of varying rates, with $\Delta Pf$ readings and calculations of $V_{calc}$ by simple Boyle's Law computations.

FIG. 5 illustrates a plot of such values.

At point A, $\Delta Pf$ is 27 and $V_{calc}$ is 7.303.

At point B, $\Delta Pf$ is 14 and $V_{calc}$ is 9.303, so a correction of $\Delta V_{calc}$ equal to 2 is required.

Equation at point A is:

$$\text{correction value} = \Delta V_{calc} = 0 = k_2\, 27 - C_{st}$$

At point B:

$$\Delta V_{calc} = +2 = k_2\, 14 - C_{st}$$

Solving these equations simultaneously gives:

$$k_2 = 0.154$$

$$C_{st} = 4.154$$

The test is again run to verify that $V_{calc}$ will remain the same for any setting of the needle valve 34.

If there is a variation, the slope can be corrected depending on the test results. For example, if the correction is too high with increasing leak rates, the slope of the curve must be lowered slightly, as illustrated in FIG. 5.

That is, a new point C is plotted: $\Delta V_{calc} = 2$; $\Delta Pf = 13$

Resolving the equations for A and C:

$$k_2 = 0.143 \quad C_{st} = 3.860$$

To fully verify, the test can be run after adding exactly one liter to ensure repeatability of 0.3 liters. Verifying the fill level in the transmission after adding $V_{calc}$ should be done.

If the oil levels resulting from adding the corrected calculated fill volumes of oil $V_{calc}$ are mainly too high, decreasing the assumed theoretical $V_{ho}$ value and vice versa will if too low make closer results achievable by thereby determining empirically a more precise value for subsequent use in testing of receptacles in the series being tested.

Referring again to FIG. 1, if a gross leak is detected by detecting a decline of the pressure difference $\Delta Pf$ below a predetermined level, a fault alarm 50 may be triggered and the calculation disabled. This is because the later measured pressure $Pf_2$ reduced by the presence of a leak, and the greater the leak the greater the reduction. However since $Pf_2$ is normally greater than $Pf_1$ (see FIG. 2), a reduction in $Pf_2$ results in a reduction in $\Delta Pf$. Thus, an operator may inspect the seals, etc., or merely add a predetermined volume of fluid manually.

We claim:

1. A method of determining the net internal volume of each of a series of test piece receptacles each containing a variable but unknown volume of liquid, the volume of which is to be subtracted from the dry internal volume of said receptacles to arrive at said net internal volume, to thereby enable calculation of the volume of liquid to be added to bring the level of liquid in each piece test piece receptacle to a predetermined level, comprising the steps of:

pressurizing a reference vessel having an interior space of known volume with a gas and thereafter preliminarily sensing the pressure level in said pressurized reference vessel;

placing said pressurized vessel in communication with the interior space of a selected one of said receptacles by means of fluid passages of known volume so as to allow expansion of said gas in said reference vessel thereinto;

initially sensing the gas pressure in a system comprising said connected reference vessel, said fluid passages and said selected receptacle shortly after placing the reference vessel in communication with the selected receptacle but substantially before said pressure stabilizes therein;

subsequently sensing the gas pressure in said system again after said gas pressure has substantially stabilized therein;

determining the difference between said initially and subsequently sensed gas pressures;

calculating the net internal volume of said selected receptacle from the proportion of the preliminarily sensed pressure level in said reference vessel to the subsequently sensed pressure level in said system and the value of said dry internal volume of said receptacle;

correcting the calculated value of said net internal volume of the selected receptacle by reducing said calculated value by a correction function inversely related to the difference between said initially and subsequently sensed pressure levels;

repeating each of said steps for each successive test piece receptacle.

2. The method according to claim 1 wherein said correction function is of the form:

$$k_2 \Delta Pf - C_{st}$$

where: $k_2$ is a correction factor; $\Delta Pf$ is the difference between said initially and subsequently sensed pressures; and, $C_{st}$ is a constant equal to $k_2\, \Delta Pf$ for the $\Delta Pf$ produced with no leak present.

3. The method according to claim 2 where $k_2$ and $C_{st}$ are determined by testing a dry reference receptacle to determine the correction function by introducing one or more leak rates from said reference receptacle.

4. The method according to claim 2 further comprising the step of calculating the volume of liquid to be added to said selected receptacle by subtracting the net internal volume of said selected receptacle containing said predetermined level of liquid from said calculated volume.

5. The method according to claim 4 wherein each of said receptacles is substantially identical, said method further comprising assuming a theorical net internal volume of said selected receptacle when it has been filled to the predetermined level and subsequently adjusting the value of said assumed net internal volume after measuring the actual liquid level in said selected receptacle resulting after adding said calculated volume of liquid, to thereby determine empirically the precise net internal volume value for subsequent testing of receptacles in said series.

6. The method according to claim 1 further including generating an alarm signal whenever the leak rate exceeds a predetermined rate as determined by a detection of a decline of said pressure difference below a predetermined level.

7. A method of filling an automatic transmission with a desired volume of fluid, said transmission having interior spaces of a known internal dry volume, with an unknown residual volume of fluid contained therein to achieve a predetermined fluid level in said transmission, comprising the steps of:

pressurizing with a gas a reference vessel to an accurately controlled pressure level;

subsequently placing said pressurized vessel in communication with the interior spaces of said transmission after sealing the outlets from said transmission so as to allow expansion of said gas through a system including said reference vessel and the interior spaces of said sealed transmission;

initially reading the pressure in said system shortly after expansion is initiated and subsequently again after said pressure substantially stabilizes;

determining the net volume of said transmission interior spaces, i.e., the internal dry volume of said interior spaces less the volume of said residual fluid from the change in pressure from the predetermined level in said reference vessel to the stabilized pressure level;

calculating the fill volume of fluid to be added by subtracting the net volume from the known internal dry volume to find the residual volume, and subtracting the residual volume from the predetermined desired volume;

correcting the calculated fill volume by a correction function of the form:

$$-C_{st}+k_2\Delta Pf$$

where $C_{st}$ is a constant correction, $k_2$ is a correction factor, and $\Delta Pf$ is the difference between said initially and subsequent read pressures;

deriving the values of $C_{st}$ and $k_2$ empirically by testing a sample transmission configured identically to said transmission to be filled to simulate various small leaks and determining the effect such small leakage has on $\Delta P$ and the calculated volume of the transmission internal spaces.

* * * * *

UNITED STATES PATENT AND TRADEMARK OFFICE
CERTIFICATE OF CORRECTION

PATENT NO. : 4,763,518
DATED : August 16, 1988
INVENTOR(S) : Jean-Michel Daviaud et al It is certified that error appears in the above-identified patent and that said Letters Patent is hereby corrected as shown below: Title page:

Abstract, line 11, "reduce" should be --reduced--.

Column 1, line 14, "transmissioons" should be --transmissions--

Column 4, line 38, "stabiliztion" should be --stabilization--.

Column 5, line 15, "of$V_{calc}$" should be --of $V_{calc}$--.

Column 5, line 63, "$Pf_2$ reduced" should be --$Pf_2$ is reduced--.

Column 6, line 35 (Claim 1), "volume of said" should be --volume of said selected--.

Column 6, line 65 (Claim 5), "theorical" should be --theoretical--.

Column 8, line 2 (Claim 7), "after" should be --after said--.

Column 8, line 22 (Claim 7), "subsequent" should be --subsequently--.

UNITED STATES PATENT AND TRADEMARK OFFICE
CERTIFICATE OF CORRECTION

PATENT NO. : 4,763,518

DATED : August 16, 1988

INVENTOR(S) : Jean-Michel Daviaud et al

It is certified that error appears in the above-identified patent and that said Letters Patent is hereby corrected as shown below:

Column 8, line 26 (Claim 7), "effect such" should be
--effect each such--.

Signed and Sealed this

Twenty-seventh Day of December, 1988

*Attest:*

DONALD J. QUIGG

*Attesting Officer*     *Commissioner of Patents and Trademarks*